May 15, 1956 — P. GRAFSTEIN — 2,745,265
DETACHABLE RING GUARD FOR FINGER RINGS
Filed Sept. 25, 1952 — 3 Sheets-Sheet 1
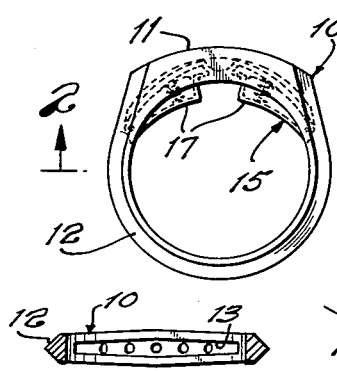
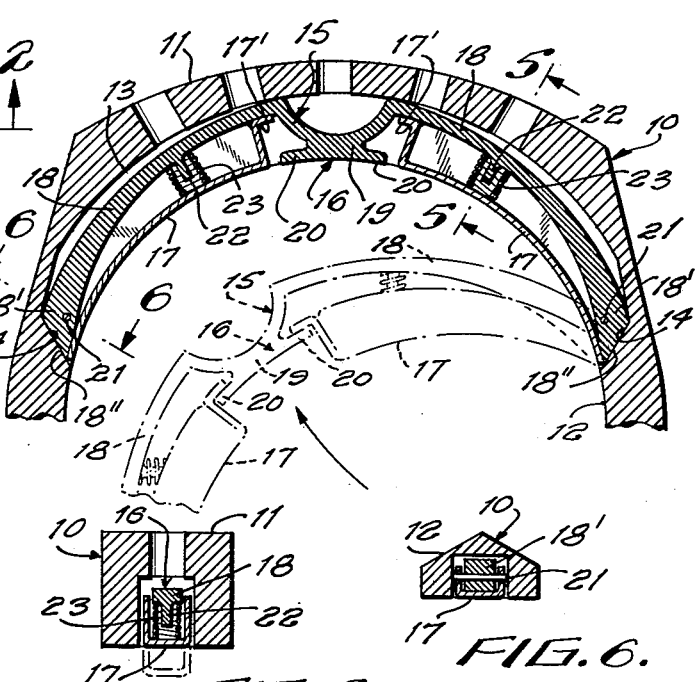
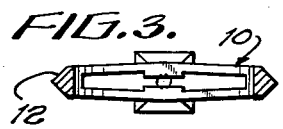
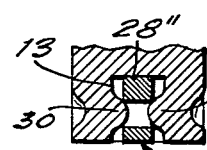
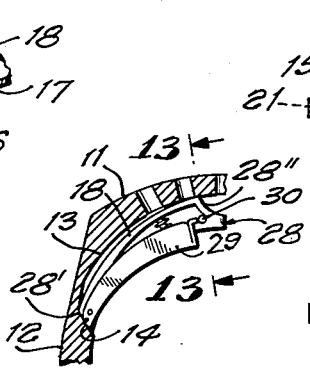
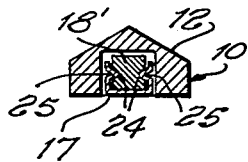
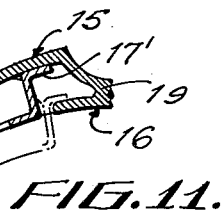
INVENTOR.
PETER GRAFSTEIN
BY
ATTORNEY May 15, 1956 P. GRAFSTEIN 2,745,265
DETACHABLE RING GUARD FOR FINGER RINGS
Filed Sept. 25, 1952 3 Sheets-Sheet 2
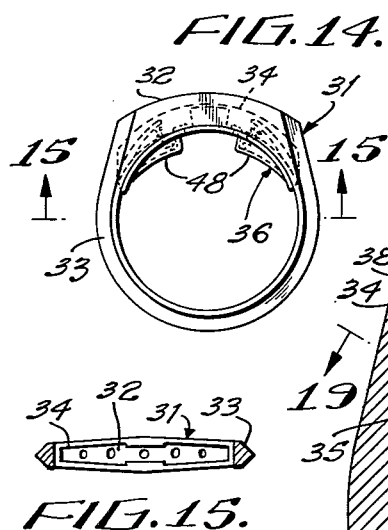
FIG.14.
FIG.15.
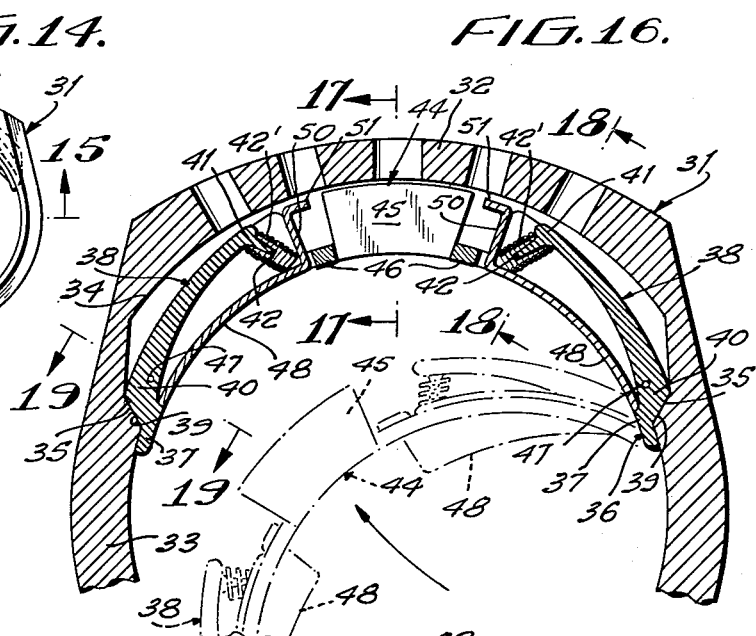
FIG.16.
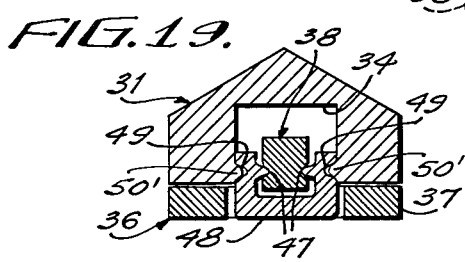
FIG.19.
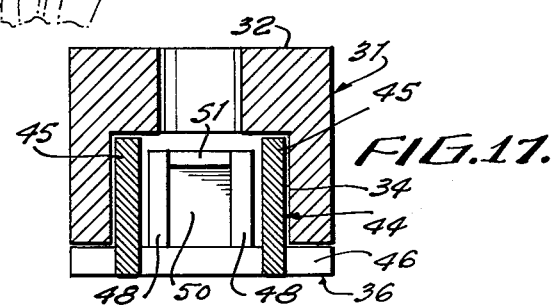
FIG.17.
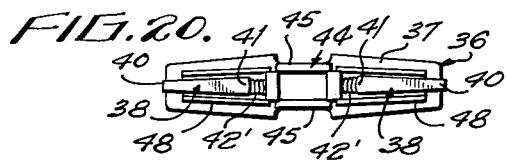
FIG.20.
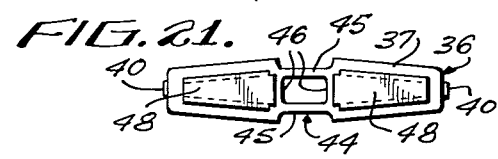
FIG.21.
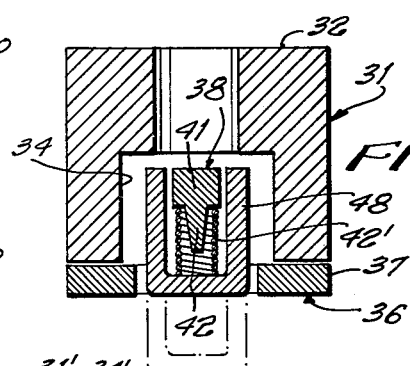
FIG.18.
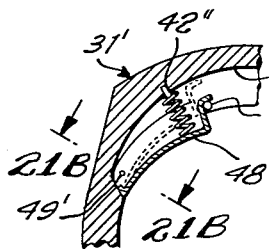
FIG.21A.
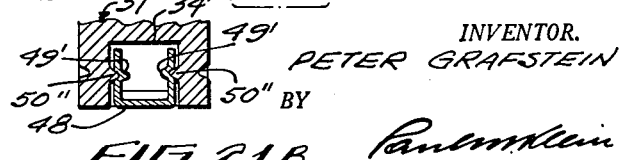
FIG.21B.
INVENTOR.
PETER GRAFSTEIN
BY
Paul M Klein
ATTORNEY

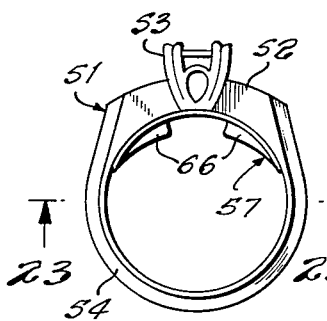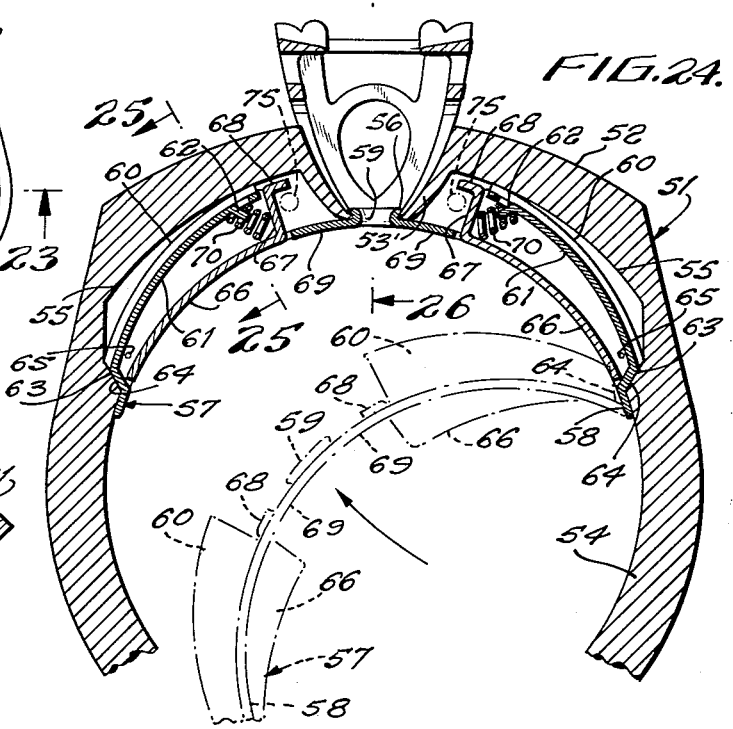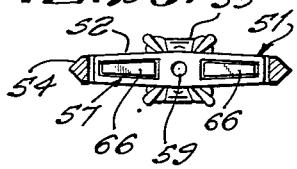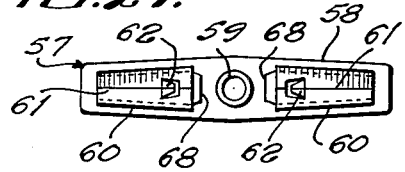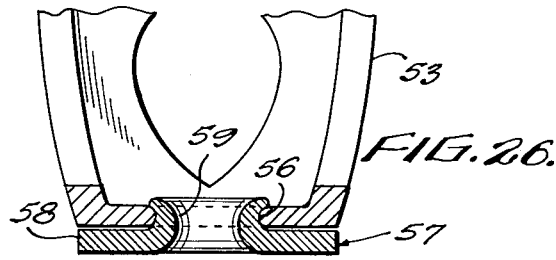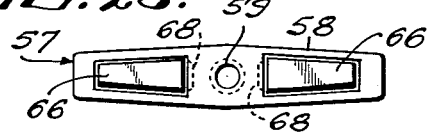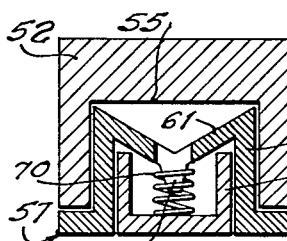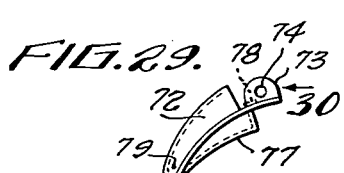

United States Patent Office 2,745,265
Patented May 15, 1956

2,745,265

DETACHABLE RING GUARD FOR FINGER RINGS

Peter Grafstein, New York, N. Y., assignor to Axel Bros., Inc., Long Island City, N. Y., a corporation of New York Application September 25, 1952, Serial No. 311,350

4 Claims. (Cl. 63—15.6)

This invention relates generally to ring structures similar to that disclosed in my Patent No. 2,541,415, and particularly pertains to a finger ring with a ring guard which is adapted to automatically adjust itself to various sizes of the finger slipped through the ring, thereby assuring the correct fit of the ring, providing security against loss of the ring while worn and affording comfort for the wearer.

The prime object of this invention is the provision of a finger ring with a relatively inexpensive, simple and very effective, self-adjusting ring guard.

Another object of this invention is the provision of an effective ring guard which is adapted to be readily secured to or removed from an existing finger ring and which will automatically effect the proper adjustment of a ring to various finger dimensions and will assure not only security against loss of the ring but also comfort during wear.

A further object of this invention is the provision of a ring and ring guard combination, wherein the ring is equipped with a gem setting and a recess in the vicinity or in back of the gem setting, and wherein the ring guard is removably associated with the ring recess and is movable in respect thereto.

A still further object of this invention is the provision of a combination ring and ring guard structure, wherein the ring body includes a gem setting, either a continuous recess or a pair of symmetrical recesses adjacent to and in rear of such gem setting, and wherein said ring guard comprises a substantially stationary member and at least one mobile, depressible element operatively connected with said member, and wherein spring means are provided to normally urge said mobile element to project into the ring opening, but permitting the element, when depressed, to recede into the recess to an extent sufficient to readily facilitate the placing of the ring onto or its removal from a finger, while constantly but gently forcing the element against the finger during wear.

Another object of this invention is the provision of a ring guard composed of a substantially stationary but resilient member adapted to be sprung into the recess of an existing ring body and with which stationary member are operatively associated substantially channel-shaped, tapering mobile elements which are hingedly connected at their narrow ends with the outer ends of the stationary member, while their broader ends converge and terminate in projecting lips, and wherein said stationary member is provided with means serving as stop for said lips, and wherein the mobile elements are normally urged into the ring opening and are adapted to recede into the ring recess or recesses provided in the ring body when the ring is slipped over a finger.

Still another object of the present invention is the provision of a ring guard which may be readily snapped into and securely anchored within the recess provided adjacent or in the rear of the gem setting of a ring, and which ring guard is neither obtrusive nor readily detachable once so applied to the ring, and which ring guard is rendered virtually invisible while worn.

The foregoing and numerous other objects and additional advantages of the present invention will become more fully apparent from the ensuing description in conjunction with the accompanying drawings, showing several embodiments of the present invention, and wherein:

Fig. 1 is a plan view of a ring structure with a relatively long gem setting equipped with one form of the present ring guard;

Fig. 2 is a section taken approximately along lines 2—2 of Fig. 1, showing the extent of the gem setting and with the ring guard removed;

Fig. 3 is a section similar to that illustrated in Fig. 2, but showing a single, central gem setting;

Fig. 4 is an enlarged detail cross sectional view taken along the horizontal center plane passing through the structure illustrated in Fig. 1 and showing the ring guard in full lines as it appears when the ring is worn, and in broken lines as the ring guard is being inserted into the recess of the ring in the direction indicated by an arrow;

Fig. 5 is a section taken approximately along lines 5—5 of Fig. 4 showing a detail of the spring support;

Fig. 6 is a section taken approximately along lines 6—6 of Fig. 4 and showing the hinge connection between the stationary member and mobile element of the ring guard;

Fig. 7 is a top view of the ring guard employed in Fig. 4;

Fig. 8 is a bottom view thereof;

Fig. 9 is a modified spring support similar to that shown in Fig. 5;

Fig. 10 shows a preferred hinge connection which is a modification of that illustrated in Fig. 6;

Fig. 11 is a fragmental section through a modified construction of the ring guard employing a leaf spring for operating the mobile element;

Fig. 12 illustrates a single ring guard unit corresponding to one-half of the ring guard shown in Fig. 4;

Fig. 13 is an enlarged section taken along lines 13—13 of Fig 12;

Fig. 14 is a plan view of a ring provided with another embodiment of a ring guard structure;

Fig. 15 is a section taken along lines 15—15 of Fig. 14 with the ring guard removed;

Fig. 16 is an enlarged fragmental section taken along the horizontal plane through the ring shown in Fig. 14 with the ring guard in full-line position as it appears while the ring is being worn;

Fig. 17 is an enlarged section taken along lines 17—17 in Fig. 16.

Fig. 18 is an enlarged section taken along lines 18—18 of Fig. 16;

Fig. 19 is an enlarged section taken along lines 19—19 of Fig. 16 through the hinge connection of the ring guard;

Fig. 20 is a top view of the ring guard removed from the ring;

Fig. 21 is a bottom view thereof;

Fig. 21A is a fragmental illustration of a ring guard directly associated with the ring recess;

Fig. 21B is a section taken on lines 21B—21B of Fig. 21A.

Fig. 22 is a plan view of a ring with a central gem setting and another embodiment of the ring guard;

Fig. 23 is a section taken along lines 23—23 of Fig. 22;

Fig. 24 is an enlarged section along the horizontal plane passing through the ring shown in Fig. 22;

Fig. 25 is a fragmental enlarged section taken along lines 25—25 of Fig. 24;

Fig. 26 is a fragmental enlarged section taken on line

26—26 of Fig. 24 through the gem setting and the ring guard;

Fig. 27 is a top view of the ring guard shown in Fig. 24;

Fig. 28 is a bottom view thereof;

Fig. 29 illustrates a half version of the ring guard shown in Fig. 24; and

Fig. 30 is an end view thereof seen in the direction of the arrow 30 shown in Fig. 29.

In consulting Figs. 1 to 8, inclusive, numeral 10 denotes the body of a ring having a relatively wide gem setting 11 and a ring shank 12. It is usual that adjacent the gem setting there is provided a recess 13 which preferably reduces in width from the center towards its ends. As will be observed from Fig. 4, the ends of recess 13 terminate in inclined surfaces 14 which slant into the body of the ring, the purpose of which will become presently evident. Within recess 13 there is shown a ring guard, generally indicated at 15, which is composed of a fixed member 16, see Figs. 7 and 8, and two symmetrically arranged mobile elements 17. The fixed member comprises an arc composed of two symmetrical, arcuate legs 18 connected by a yoke 19 which is substantially cup-shaped in cross section as will be clearly seen in Fig. 4. The base of the cup terminates in stops 20. The outer portions 18' of the legs 18 are relatively wide, but decrease in thickness towards yoke 19, have inclined end surfaces 18'' which are adapted to cooperate with the interior inclined end surfaces 14 of recess 13. In outer portions 18' are provided hinge connections 21 for mobile elements 17, which latter comprise tapering channel-shaped structures, as clearly seen from Figs. 7 and 8. While the narrow ends are hingedly connected at 21 with the fixed member of the ring guard, their wider ends terminate in lips 17' which are adapted to engage stops 20 of the cup-shaped yoke for limiting the movement of the mobile elements. Extending from legs 18 are spring guides 22 accommodating expansion springs 23 which are intended to normally urge mobile elements 17 into the ring opening in the manner illustrated in Fig. 1.

The fixed or stationary member 16 of the ring guard is relatively narrow, as can be clearly seen in Fig. 5, so that mobile elements 17 straddle member 16 when they are moved into recess 13. Their inward position is shown in full lines in Fig. 5, while their normal outward position is indicated in Fig. 1. The hinge connection between member 16 and the two mobile elements 17 may be either in the form shown in Fig. 6, wherein pin 21 is employed passing through mobile element 17 and the wide end of fixed member 16, or the hinge arrangement may take the form shown in Fig. 10 wherein instead of a hinge pin there are provided indentations 24 in fixed member 16 and corresponding indentations 25 in mobile element 17.

The modified form, shown in Fig. 9, of the spring support localizes both ends of spring 23 in that in addition the spring guide 22 extending from leg 18 there is employed a forced-out tang 26 from mobile element 17.

In Fig. 11 expansion spring 23 shown in Fig. 4 is omitted and substituted by a blade spring or spring tongue 27 preferably stamped out from the material of the mobile element 17, and which tongue is adapted to bear against the inner face of leg 18 and thus normally force member 17 to its outward position shown in broken lines.

The modified form of the ring guard illustrated in Figs. 12 and 13 corresponds to just one half of the guard structure shown in Fig. 4, there again being disclosed a resilient stationary or fixed member 28 with which is hingedly connected mobile element 29. The end of member 28 at which the mobile member 29 is hinged, is provided with an inclined surface 28', similar to inclined surface 18'' of Fig. 4, and which inclined surface rests against the corresponding inclined surface 14 of recess 13. The other end of member 28 is preferably held in place by means of indentations or projections 30 forced out from the wall material of and extending into recess 13 so that they may be engaged by the half-cup-shaped end structure 28'' of member 28, as clearly seen in Fig. 13.

Fig. 14 is a plan view of a ring structure similar to that shown in Fig. 1. The ring comprises a ring body 31 having an upper enlargement 32 forming the gem setting and a shank 33. Within the body of the ring there is again provided a recess 34, adjacent or in rear of ring setting 32, the ends of the recess forming inwardly inclined surfaces 35, see Fig. 16. Within recess 34 there will be seen a removable ring guard 36 which is sprung into recess 34, in the manner indicated in broken lines and the arrow in Fig. 16. Ring guard 36 comprises a stamping having an arcuate base 37 (see Figs. 20 and 21), which is adapted to engage the interior ring periphery adjacent recess 34.

Forced out from the base are curved, prong-shaped forms or arms 38 which are adapted to project into recess 34, as clearly seen in Fig. 16. The outer ends of the curved arms 38 have inclined end surfaces 39 which are adapted to cooperate with end surfaces 35 of recess 34 as the ring guard is snapped into recess 34. The shape of forced-out arms 38 is such that their ends 40 adjacent their inclined end surfaces 39 are of greater depth than their converging ends 41 directed towards the center of the gem mounting. On the other hand the width of ends 40 is considerably less than the width of their interior ends 41 as can be clearly seen from Fig. 20. From these wider ends 41 there extend inwardly pin shaped spring guides 42 adapted to support and guide expansion springs 42'.

At the center of the base there is provided a spacer 44 comprising two parallel flanges or sections 45 which are sufficiently distanced from each other to allow unrestricted mounting of gems. These sections are preferably disposed adjacent the inner wall faces of recess 34, see Fig. 17. At both ends of sections 45 are provided cross or stop bars 46.

Hingedly connected at 47 with ends 40 of arms 38 are mobile elements 48 which are tapered and substantially channel shaped, as clearly seen in Fig. 18. Their sides or flanges encompass curved arms 38, and their webs are curved to correspond to the curvature of the interior ring surface when the elements are forced into recess 34. However, these mobile elements normally extend outwardly, as shown in Fig. 14, being brought to that position by expansion springs 42' suspended from spring guides 42 and guided into the corners of elements 48, which corners are formed between their curved webs and end portions 50 forming closures for the elements. These closing portions 50 terminate in lips 51 which are adapted to normally bear against cross bars 46 when the elements are forced out by springs 42' into their normal, outward position shown in Fig. 14.

Recesses in rear of gem settings are usually shaped in accordance with the dimensions of the ring body. Thus these recesses are widest in the vicinity of the vertical center plane passing through the ring body and narrow down towards their ends, at which latter are provided the inclined end surfaces 35. Accordingly, the shape of the ring guard, and especially of arms 38 and elements 48, has to be designed accordingly. The insertion of the ring guard into recess 34 is effected by slightly by compressing the ring guard endwise and snapping it into the recess in the manner indicated in broken lines and the arrow in Fig. 16.

For the purpose of simplicity the hinge connection 47 between arms 38 and mobile elements 48 is preferably effected by providing depressions in arms 38 and corresponding body projections at the flanges of mobile elements 48. In consequence of forming these projections, there appear in the outer surface of the flanges of mobile elements 48 aligned depressions 49, clearly seen in Fig. 19, and it is preferred that these depressions are utilized for additionally anchoring the guard structure within recess 34 by providing corresponding projections 50' at the interior wall surface of the recess.

A use similar to that shown in Fig. 19 of providing hinge connections for mobile parts of a ring guard in the ring body is illustrated in Figs. 21A and 21B, where, as an example, ring body 31', provided with recess 34', has at the flanges of the recess indentations 50'', adapted to engage similar indentations 49' of mobile element 48'. Also the spring guide 42'' in that modified form forms an integral part of ring body 31'. Referring again to Fig. 16, the cross bars 46 serving as stops for lips 51 of the mobile elements are conveniently substituted by similar cross bars 46' extending from wall to wall of recess 34'.

In Figs. 22 to 30 there is illustrated an additional embodiment of the present invention, wherein a ring is shown with a single central gem setting. Here again a ring body 51 is used, the upper portion 52 of which is enlarged as usual, but at the center of the enlargement there is arranged a single gem setting 53, and from enlargement 52 there extends the usual ring shank 54. Within enlargement 52 is provided a recess divided by central gem setting 53 into two symmetrical halves 55. It will be noted that the interior end 53' of central gem setting 53 projects between recesses 55 into the ring opening and is provided with a central aperture 56, see Fig. 26. Such construction is standard in what is known as solitaire rings with a single gem setting at the center.

The ring guard associated with the ring of the above described construction is indicated generally at 57 and is composed of a resilient, normally fixed frame 58 in the form of a bowed plate or strip from which is forced out a central projection 59 adapted to pass into and frictionally engage aperture 56 at the bottom of gem setting 53. Also forced out from the plate or strip 58 are substantially channel-shaped pockets 60, the web 61 of which are longitudinally depressed, as clearly seen in Fig. 25. From the center of these depressions and near their ends there are forced out spring guides 62 in the form of prongs. These longitudinal depressions serve for clearing auxiliary gems which may be placed at both sides of central gem setting 53.

The outer ends of recesses 55 are provided with inwardly inclined end surfaces 63, and the outer ends of channel-shaped pockets 60 are also provided with inclined end surfaces 64 which are adapted to cooperate with end surfaces 63 of the recesses when the ring guard is sprung into the ring body in the manner indicated in broken lines and the arrow.

Hingedly associated at 65 at the slimmer ends of the pockets are mobile elements 66 which are in the form of curved channels, the closing ends 67 of which terminate in lips 68, adapted to cooperate with lip stop 69 of fixed frame 58 adjacent central projection 59. Suitable expansion springs 70, guided by prongs 62 and extending into the corners formed at the broader ends of the mobile elements force these elements normally to their outward position shown in Fig. 22. At that position lips 68 will engage stops 69 of fixed frame 58, thus limiting the outward movement of mobile elements 66.

In placing the ring guard into the position shown in full lines in Fig. 24, the inclined end 64 of one of the pockets 60 is placed against the corner formed between inclined end 63 of recess 55, whereupon the ring guard is compressed at its opposite free end and is swung in the direction of the arrow towards the gem setting 53 until the inclined end surface of the opposite pocket engages the corresponding inclined end surface of recess 55 and central projection 59 snaps into aperture 56 of the central gem setting 53.

While in Fig. 24 there is illustrated a ring guard composed of a continuous frame 58 with two symmetrically arranged pockets for the reception of two symmetrically designed mobile elements, it is quite obvious that the guard can be made in two halves, one of such halves being indicated in Figs. 29 and 30. In these figures there is shown a resilient base 71, which serves in place of resilient fixed frame 58, and from which base is forced out a pocket 72 very similar in construction to pockets 60 shown in Fig. 24. But in addition there extends from base 71 a resilient double lug 73 adapted to fit into either of the recesses 55 and which double lug is provided with apertures 74.

In using this modified construction of individual guard parts, it is preferred that recesses 55 be provided with projections indicated in broken lines at 75 in Fig. 24. When one of the ring guards is placed into its respective recess, resilient double lug 73 snaps into the recess so that its openings 74 engage projections 75 in the recess. Pocket 72 is again provided with an inclined end surface 76 which is adapted for engagement with end surface 63 of the recess.

Operative within pocket 72 is mobile element 77 hingedly connected at 78 with pocket 72. Within the pocket there is again arranged an expansion spring (not shown) adapted to urge element 77 to its outward position. That element is provided with a lip 78 adapted to engage the material between double lug 73 for limiting the outward movement of the element.

In the foregoing there were discribed several modifications of ring guards adapted to be removably associated with the ring structure. Obviously the same effect can be achieved by mounting the mobile elements of such ring guards directly in the recesses of existing rings such as indicated in Figs. 21A and 21B, the only requirement being to provide pivotal connections directly in the recesses and an expansion spring extending from the outer periphery of the recesses, and providing stops for the lips with which said mobile elements are shown to be equipped.

Referring to the different embodiments of the ring guards shown and described, it becomes readily evident that changes in the detail arrangements of these structures may be required in adapting them to various commercial shapes of existing ring, for which reason such changes are deemed to reside within the scope of the present invention, as defined by the annexed claims.

What is claimed as new is:

1. The combination with a finger ring body that defines a finger-receiving opening and that is provided with a recess which is open along the inner periphery of the ring, of a ring guard comprising a resilient frame registering with the recess and having snap engagement with the ends of the recess whereby the frame is frictionally held in the recess, said frame being substantially wholly contained in the recess, a pair of spaced stop members carried by the frame, a pair of mobile elements, hinge means pivotally connecting one end of each mobile element to a corresponding end portion of the frame, an extension at the other end of each mobile element, and spring means interposed between the frame and each mobile element for normally and yieldingly urging each mobile element about its pivot connection with the frame to project the mobile elements into the finger-receiving opening, each of said extensions engaging a corresponding one of said stop members to limit normal movement of the corresponding mobile element about its pivot connection with the frame.

2. The combination according to claim 1 wherein each mobile element includes a pair of spaced resilient flanges connected by a base portion, said hinge means comprising projections carried by the flanges and registering with deprssions formed in the frame.

3. The combination according to claim 1 wherein each mobile element is made of a resilient material, said spring means comprising a tongue struck from each mobile element and bearing against the frame.

4. The combination according to claim 1 wherein each mobile element is made of a resilient material and includes a pair of spaced flanges connected by a base portion, said hinge means comprising projections carried by the flanges and registering with depressions formed in the frame, said spring means comprising a tongue struck from the base portion of each mobile element and bearing against the frame.

References Cited in the file of this patent
UNITED STATES PATENTS

| | | |
|---|---|---|
| 1,219,172 | Segman | Mar. 13, 1917 |
| 2,615,314 | Axel | Oct. 28, 1952 |

FOREIGN PATENTS

| | | |
|---|---|---|
| 907,191 | France | Mar. 5, 1946 |